US011899601B1

United States Patent
Thakore et al.

(10) Patent No.: US 11,899,601 B1
(45) Date of Patent: Feb. 13, 2024

(54) CREDIT SYNCHRONIZATION BY SENDING A VALUE FOR A LOCAL CREDIT IN A MESSAGE SENDER FROM A MESSAGE RECEIVER TO THE MESSAGE SENDER IN RESPONSE TO A SYNCHRONIZATION TRIGGER

(71) Applicant: Beijing Tenafe Electronic Technology Co., Ltd., Beijing (CN)

(72) Inventors: Priyanka Nilay Thakore, Mountain View, CA (US); Lyle E. Adams, San Jose, CA (US)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

(21) Appl. No.: 18/212,866

(22) Filed: Jun. 22, 2023

Related U.S. Application Data

(60) Provisional application No. 63/392,988, filed on Jul. 28, 2022.

(51) Int. Cl.
*G06F 13/38* (2006.01)

(52) U.S. Cl.
CPC .................................. *G06F 13/382* (2013.01)

(58) Field of Classification Search
CPC ... G06F 9/46; G06F 9/52; G06F 9/524; G06F 9/5088; G06F 9/5083; G06F 13/38; G06F 13/382; G06F 13/385; G06F 13/387; G06F 13/42; H04L 49/557
See application file for complete search history.

(56) References Cited

U.S. PATENT DOCUMENTS

| | | | |
|---|---|---|---|
| 6,715,007 B1 * | 3/2004 | Williams | H04L 47/263 370/231 |
| 9,385,962 B2 | 7/2016 | Rimmer | |
| 9,836,424 B2 | 12/2017 | Ajanovic | |
| 2003/0026267 A1 | 2/2003 | Oberman | |
| 2005/0137966 A1 * | 6/2005 | Munguia | H04L 69/40 705/38 |
| 2006/0153078 A1 | 7/2006 | Yasui | |
| 2008/0062873 A1 * | 3/2008 | Semrad | H04L 12/66 370/232 |
| 2013/0125127 A1 * | 5/2013 | Mital | G06F 9/4856 718/102 |
| 2016/0191303 A1 * | 6/2016 | Kontz | H04L 47/29 370/217 |

OTHER PUBLICATIONS

H.T. Kung, Traffic Management for High-Speed Networks, 1997.
Kung et al., Receiver-Oriented Adaptive Buffer Allocation in Credit-Based Flow Control for ATM Networks, Proceedings of INFOCOM'95, 1995, pp. 239-252.

* cited by examiner

*Primary Examiner* — Raymond N Phan
(74) *Attorney, Agent, or Firm* — Van Pelt, Yi & James LLP

(57) ABSTRACT

A synchronization trigger associated with synchronizing credit is obtained at a message receiver in a System On Chip (SOC). In response to receiving the synchronization trigger, a value for a local credit in the message sender is sent from the message receiver to a message sender in the SOC. At the message sender, the local credit is updated with the value for the credit that is received from the message receiver, wherein a requirement to send a message from the message sender to the message receiver is that the local credit has a non-zero value.

20 Claims, 10 Drawing Sheets

CREDIT SYNCHRONIZATION BY SENDING A VALUE FOR A LOCAL CREDIT IN A MESSAGE SENDER FROM A MESSAGE RECEIVER TO THE MESSAGE SENDER IN RESPONSE TO A SYNCHRONIZATION TRIGGER

CROSS REFERENCE TO OTHER APPLICATIONS

This application claims priority to U.S. Provisional Patent Application No. 63/392,988 entitled CREDIT INITIALIZATION IN PERIPHERAL MODULE filed Jul. 28, 2022 which is incorporated herein by reference for all purposes.

BACKGROUND OF THE INVENTION

Message passing is an efficient way for modules (e.g., a hardware functional module, a processor module, etc.) in a System On Chip (SOC) to communicate with each other (e.g., on-chip). When message arrival rates and message processing rates are variable, a flow control technique is sometimes utilized to ensure that message receive buffers do not overflow, which can lead to message loss.

One technique to prevent buffer overflow is the backpressure approach. With the backpressure approach, the message receiver communicates to the message sender when the message receive buffer is (e.g., almost) full; the message sender temporarily stops sending messages until the message receiver indicates that more messages can be sent. Backpressure is simple and effective, but it may be undesirable for pipelined connections because backpressure takes time to refill the pipeline, leading to increased message-passing latency.

Another approach is the credit approach. Existing credit techniques may be insufficient and/or suboptimal in certain situations. New credit-based approaches (e.g., which have better performance during such situations or scenarios) would be desirable.

BRIEF DESCRIPTION OF THE DRAWINGS

Various embodiments of the invention are disclosed in the following detailed description and the accompanying drawings.

DETAILED DESCRIPTION

Figure 1:
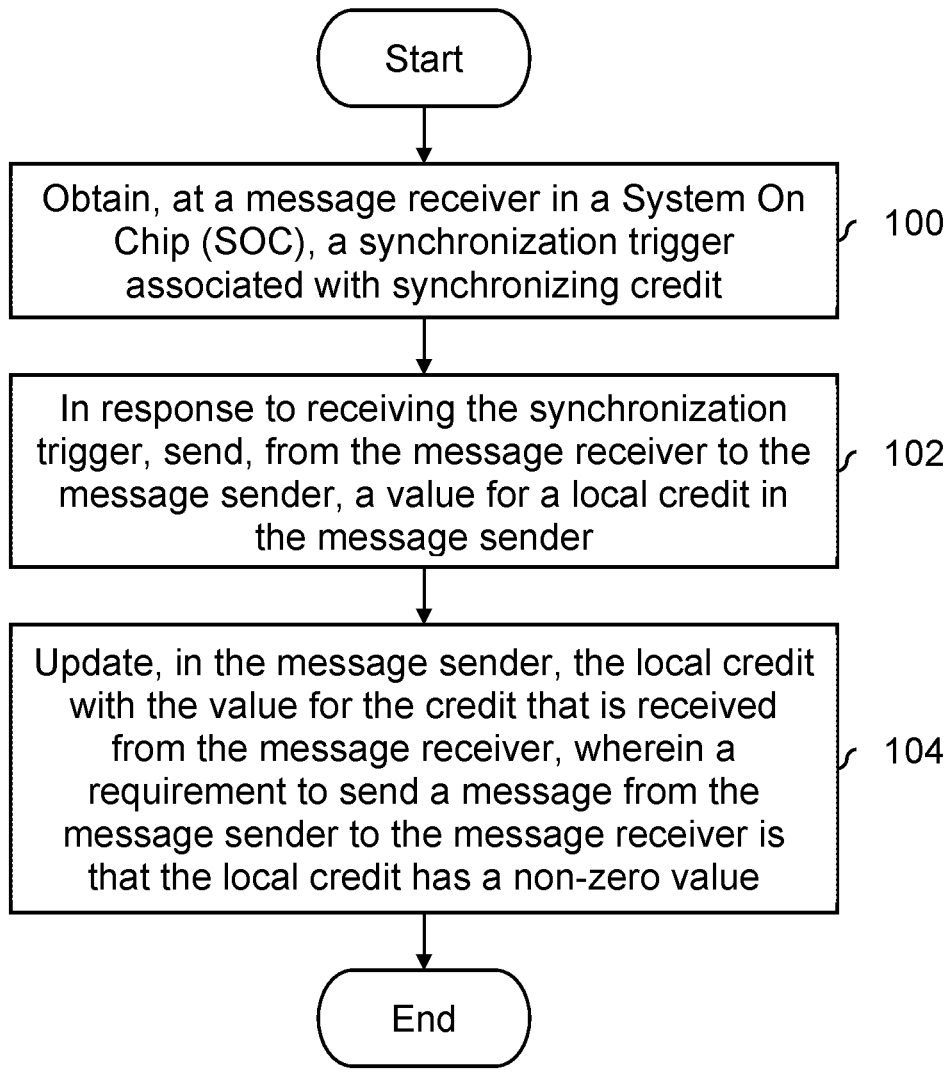
FIG. 1 is a flow chart illustrating an embodiment of a process for synchronizing credit.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In a System On Chip (SOC), modules (e.g., hardware functional modules, processor modules on which firmware runs, etc.) send a variety of messages to other modules. For example, one module may send another module a status message, asking for state or status information from and/or about the message receiver. Another type of message is a command message, where the message receiver is instructed to perform some command, instruction, or operation.

Messages are stored in some input or receive buffer at the message receiver until they are processed by the message receiver. Depending upon the arrival rate of messages, the size of the receive buffer, and the processing rate of the message receiver, the receive buffer could overflow and some messages could be lost.

One technique to prevent a receive buffer from overflowing is to use credit. With a credit-based approach, a message sender tracks and maintains a credit (e.g., having some value). For a message sender to be able to send a message (e.g., to a particular message receiver), the credit must have a non-zero value (e.g., strictly positive). The credit may be "sized," initialized, and/or set to a value that is appropriate for the situation and/or conditions. For example, if: (1) a receive buffer is relatively large, (2) the arrival rate of messages is relatively low, and/or (3) the processing rate of the message receiver is relatively high, then the credit may be initialized to a relatively large value. In contrast, if: (1) a receive buffer is relatively small, (2) the arrival rate of messages is relatively high, and/or (3) the processing rate of the message receiver is relatively low, then the credit may be initialized to a relatively small value (e.g., a value of 1).

A credit-based approach may be preferred over a backpressure approach in SOC applications with pipelined connections where latency matters because with the backpressure approach, it takes a not-insubstantial amount of time to (re-)fill the pipelined connections which negatively affects latency.

The following figure describes a technique for synchronizing a credit. For example, such a synchronization process may be performing during initialization (e.g., when an SOC is powered on), or if a message sender and message receiver lose synchronization with each other and a credit resynchronization needs to be performed.

FIG. 1 is a flow chart illustrating an embodiment of a process for synchronizing credit. In some embodiments, the synchronization process of FIG. 1 is performed during and/or in response to initialization and/or when the SOC is powered on. In some embodiments, the synchronization process of FIG. 1 is performed in response to a loss of synchronization between a message sender and message receiver (e.g., because a message receiver freezes and/or becomes unresponsive, enters an error or exception state, etc.).

At 100, a synchronization trigger associated with synchronizing credit is obtained, at a message receiver in a System On Chip (SOC).

For example, an SOC may include one or more hardware functional modules and one or more processor modules (e.g., a CPU, a microprocessor, etc.) on which firmware runs. In some embodiments, a message receiver is a hardware functional module in the SOC. Conceptually, the hardware functional module (that is or otherwise acts as a message receiver) may be thought of as a peripheral module that performs operations at the behest of a (e.g., central) processor module and/or firmware.

For brevity, the term "firmware" in some instances herein includes or otherwise comprises a (e.g., central) firmware complex that includes firmware, a processor module (e.g., a CPU, an embedded core, etc.), and/or a messaging module (e.g., that receives (e.g., functional) messages relating to credit initialization and/or re-synchronization from a message receiver and performs an operation or instruction associated with a received message). In some embodiments, firmware includes the message sender (or vice versa). An embodiment of a (e.g., central) firmware complex is described in more detail below.

As used herein, the term "synchronization trigger" means that there is some indication, trigger, and/or signal that a credit synchronization should be performed. In one example, the synchronization trigger is enabled or otherwise activated when some signal or register goes from a Boolean FALSE (e.g., 0) to a Boolean TRUE (e.g., 1), or from a zero value to a non-zero value.

In some embodiments, the synchronization trigger is enabled or otherwise activated during an initialization process performed at or on a message receiver. For example, when an SOC is powered on, a message receiver may perform some initialization process and one of the steps or operations of the initialization process is to (as example) drive some register or signal from 0 to 1 (or some other non-zero value).

In some embodiments, the synchronization trigger is enabled or otherwise activated in response to (e.g., a message receiver experiencing) an error, exception case, hang, freeze, etc. For brevity, these scenarios are sometimes collectively referred to herein as loss of synchronization scenarios (e.g., just the credit without loss of functionality and/or performance at either end, or due to some loss of functionality and/or performance at one or both ends). Some examples of enabling a synchronization trigger in response to a loss of synchronization are described in more detail below.

In some embodiments, obtaining a synchronization trigger at step 100 includes the message receiver determining or otherwise deciding (e.g., for itself) that it needs to perform a credit synchronization. In one example, a synchronization trigger included in an initialization sequence is performed during initialization of the message receiver.

In some embodiments, obtaining a synchronization trigger at step 100 includes receiving a synchronization trigger from some other module or block (e.g., other than the message receiver). For example, suppose the message receiver is a hardware functional module and firmware detects that the message receiver has frozen and/or there is some loss of (credit) synchronization. In some such embodiments, the firmware writes to a register (or via some other communication channel or technique) to communicate a synchronization trigger to the message receiver.

At 102, in response to receiving the synchronization trigger, a value for a local credit in the message sender is sent from the message receiver to the message sender.

In some embodiments, sending a value for a local credit at step 102 includes sending a (e.g., functional) message associated with incrementing the local credit in the message sender (e.g., increment by one). In some embodiments, an increment message is preceded by a (e.g., functional) message associated with clearing the local credit in the message sender (e.g., to a zero value). For example, during a credit re-synchronization scenario, the local credit (which may be at an unknown value) may need to be cleared first before incrementing (e.g., if the only supported messages are "clear" and "increment").

As will be described in more detail below, in various embodiments, the value for the credit (e.g., that is sent from the message receiver to the message sender at step 102) is obtained from a variety of sources. In some embodiments, the value for the credit is obtained from a default and/or hardcoded value (e.g., in the message receiver). In some embodiments, the value for the credit is obtained from a writeable register and firmware (as an example) writes the register with the value for the credit and then (e.g., subsequently, after writing the value of the credit) enables or otherwise activates the synchronization trigger. For example, it may be desirable to have the ability for firmware to program a credit value that overrides a default value. In one example where this ability is desirable, suppose there is a bug. In another example, there may be application specific reasons why it is desirable to artificially throttle performance.

At 104, in the message sender, the local credit is updated with the value for the credit that is received from the message receiver, wherein a requirement to send a message from the message sender to the message receiver is that the local credit has a non-zero value.

In some embodiments, the message sender is a hardware functional module. In some embodiments, the message sender includes a messaging module that performs or otherwise executes received functional messages relating to credit synchronization, where the messaging module (and possibly other parts of the credit manager) is implemented in hardware, independent of a processor module and/or firmware. For example, this may be desirable so that execution of messages related to credit synchronization is offloaded from the processor module and firmware so as not to interfere with operations performed there.

To help illustrate some (e.g., technical) advantages associated with the synchronization process described in FIG. 1, it may be helpful to first describe a different credit synchronization technique. The following figure illustrates one such example.

Figure 2:
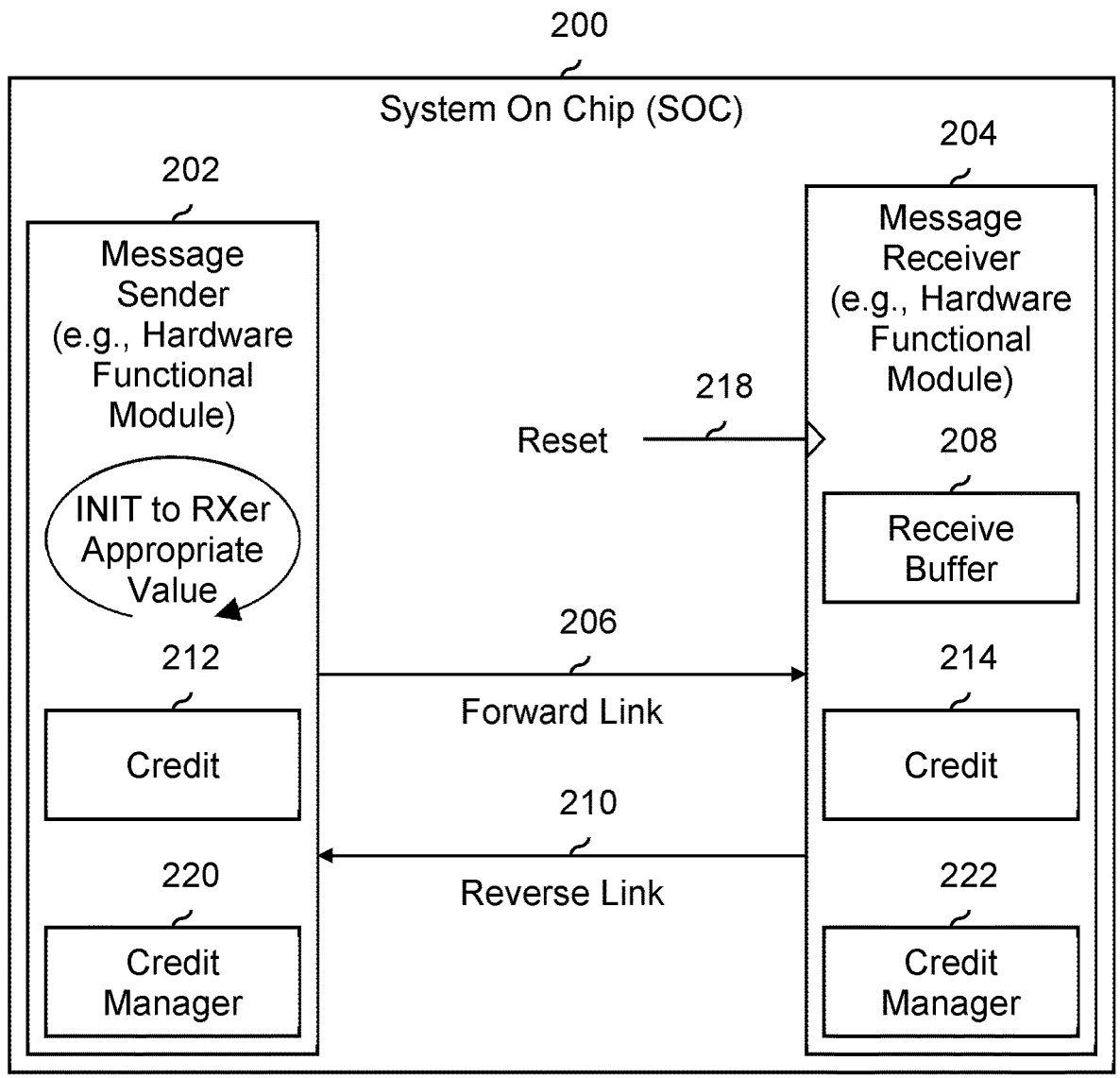
FIG. 2 is a diagram illustrating an example of a different type of credit synchronization technique.

FIG. 2 is a diagram illustrating an example of a different type of credit synchronization technique. In this example, an SOC (200) includes a message sender (202), associated with and/or included in a hardware functional module, and a message receiver (204), associated with and/or included in a (e.g., different) hardware functional module. In some other embodiments, the message sender (202) and/or the message receiver (204) are some other type of module or block within the SOC (200).

In this example, messages are sent from the message sender (202) to the message receiver (204) via a forward link (206), where received messages are stored in a receive buffer (208) in the message receiver (204). Messages are sent via the forward link (206), assuming the (local) credit (212) at the message sender (202) is non-zero; if a message is sent then the credit manager (220) decrements the credit (212) by one. Credit is returned via the reverse link (210) once a message from the message sender (202) has been processed and/or the receive buffer (208) has space; the credit manager (220) at the message sender (202) then increments the credit (212) by one. A credit manager (222) in the message receiver (204) manages the credit (214) in the message receiver (204).

It is noted that messages may be sent in the other direction from the message receiver (204) to the message sender (202) via the reverse link (210) for which a separate credit (not shown) is independently managed, but for simplicity and clarity, that message-sending direction is not described herein. Similarly, there may be other, additional message senders to the exemplary message receiver (204), but again for simplicity and clarity, additional message senders are not shown in examples described herein.

To prevent the overflow of the receive buffer (208) in the message receiver (204) and the loss of messages, a credit-based approach is used in this example. The responsibility for credit synchronization rests with the message sender (202) so that the credit manager thereon (220) is responsible for initializing the (local) credit (212) on the message sender (220) to an initial value that is appropriate for a given message receiver. In other words, the credit manager (220) in the message sender (202) must know (e.g., ahead of time and/or without having to be told) the proper and/or correct value the local credit (212) should be set to (e.g., equal to and/or proportional to the number of messages that can be held in the receiver buffer (208)). This means that the message sender (202), or whichever other module or device is responsible for initializing the (local) credit (212), needs to pre-know (i.e., ahead of time) the receiver appropriate value. There are many message receivers in the system (and they all do not necessarily have the same initial, receiver appropriate value) and so initialization is not a trivial task.

In this example, during operation of the SOC (200), if there is a loss of synchronization (e.g., between credit (212) and credit (214)), a reset (218) may need to be applied to the message receiver (204). Such a reset (218), with credit synchronization that is managed at the message sender (202), is not necessarily limited to the message sender (202) or message receiver (204). For example, suppose that the message receiver (204) is a hardware functional module and that there are other hardware functional module(s) (not shown) that are connected (e.g., directly) to the message receiver (204) in daisy-chain fashion (e.g., without "returning" to the message sender (202)).

A drawback to the credit synchronization approach shown in FIG. 2 is that resets may affect other modules that would otherwise not necessarily need to be reset. For example, if a reset (218) is applied to a message receiver (204), which in this example is a hardware functional module, resets may also need to be applied to other hardware functional modules (not shown) that are connected in daisy-chain fashion to the message receiver (204). For example, this need to reset other hardware functional modules may be because with a (e.g., centralized and/or global) credit synchronization, there is no good way to communicate or otherwise resynchronize to those other hardware functional modules. This means that a reset could impact a large portion of the SOC (200), making this (other) credit synchronization approach shown in FIG. 2 undesirable.

The following figures describe an embodiment of credit synchronization that is controlled by and/or originates from a (e.g., peripheral) messenger receiver during initialization.

Figure 3A:
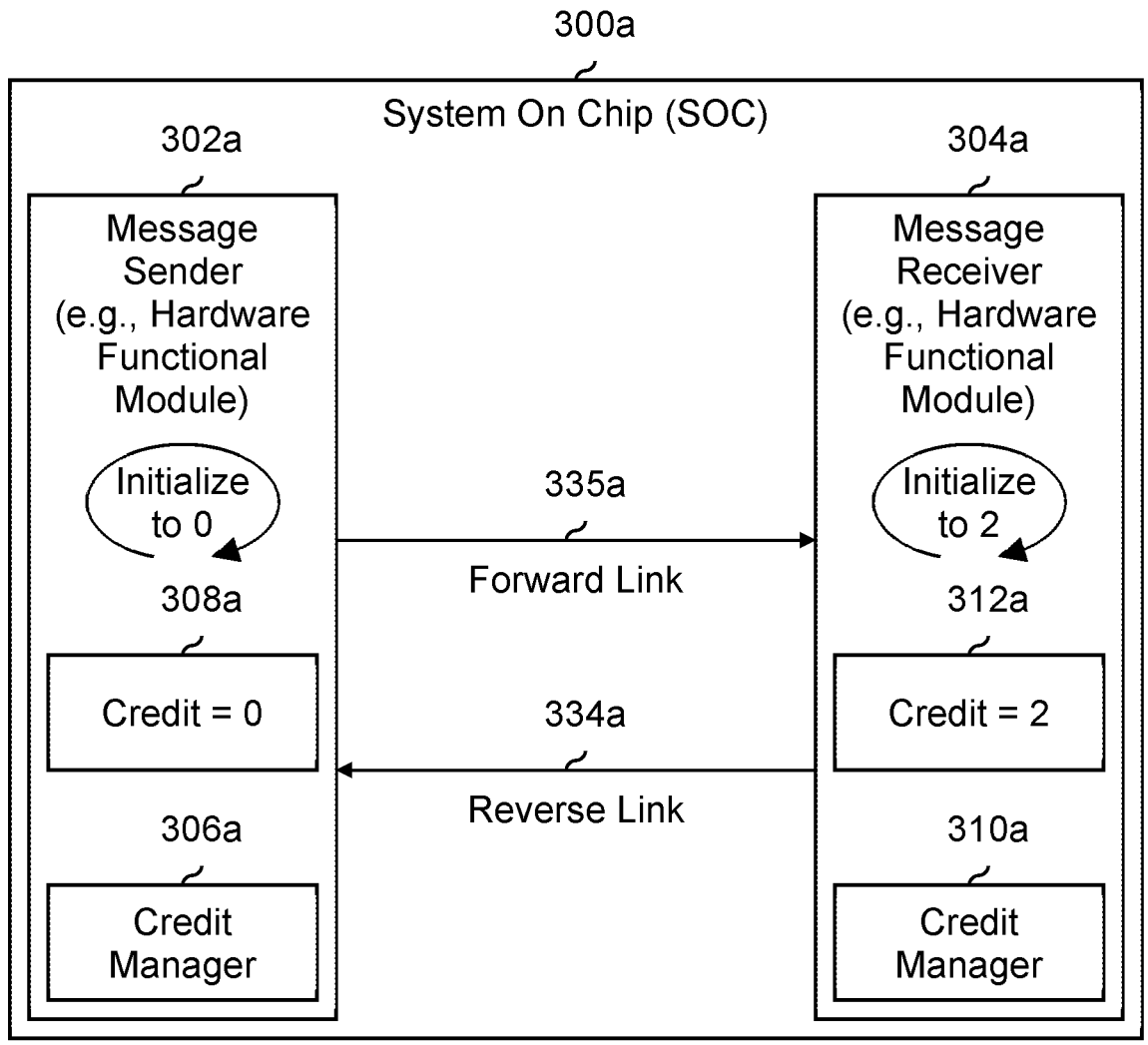
FIG. 3A is a diagram illustrating an embodiment of credit synchronization during initialization where a messenger receiver specifies the credit value to a message sender.

FIG. 3A is a diagram illustrating an embodiment of credit synchronization during initialization where a messenger receiver specifies the credit value to a message sender. In this example, an SOC (300a) includes a message sender (302a), such as a hardware functional module, and a message receiver (304a), such as a different hardware functional module. The receive buffer (e.g., shown in the previous figure) is not directly relevant to the techniques described herein, and so for simplicity and brevity, the exemplary message receiver (304a) does not show a receive buffer.

In this example, the SOC (300a) is powered on and the message sender (302a) and message receiver (304a) initialize. In this example, credit synchronization is not centralized but rather is distributed at the periphery. As such, the credit manager (306a) in the message sender (302a) knows that it will be told what non-zero value to set the (e.g., local) credit (308a) to, so the credit manager (306a) initializes the (e.g., local) credit (308a) to zero (at least in this example) and waits.

The credit manager (310a) in the message receiver (304a) initializes its credit (312a) to some initial value, which in this example is a value of two. In some embodiments, the value used to initialize the credit (312a) in the message receiver (304a) is set or otherwise provided by firmware (not shown in this figure). For example, it may be desirable to have firmware program the credits the credit (312a) in the message receiver (304a) if there is a need or desire for a default value to be overridden. Alternatively, in some embodiments, a default and/or hardcoded value is used for the initial value for the credit (312a) in the message receiver (304a). In some embodiments, the size of a receive buffer (not shown) is variable (e.g., the receive buffer is implemented on a separate memory device other than the SOC and the size of that separate memory device can vary) and an initial value is based on the (e.g., allocated and/or assigned) size.

Although the forward link (335a) and reverse link (334a) are shown as separate and/or independent links in this example, in some embodiments, a single link is used. For example, a single link may optimize the area used without altering the techniques described herein. The links (e.g., 334a and 335a) described herein are logical and may be composed of one or more physical links (e.g., using a daisy chain configuration).

Figure 3B:
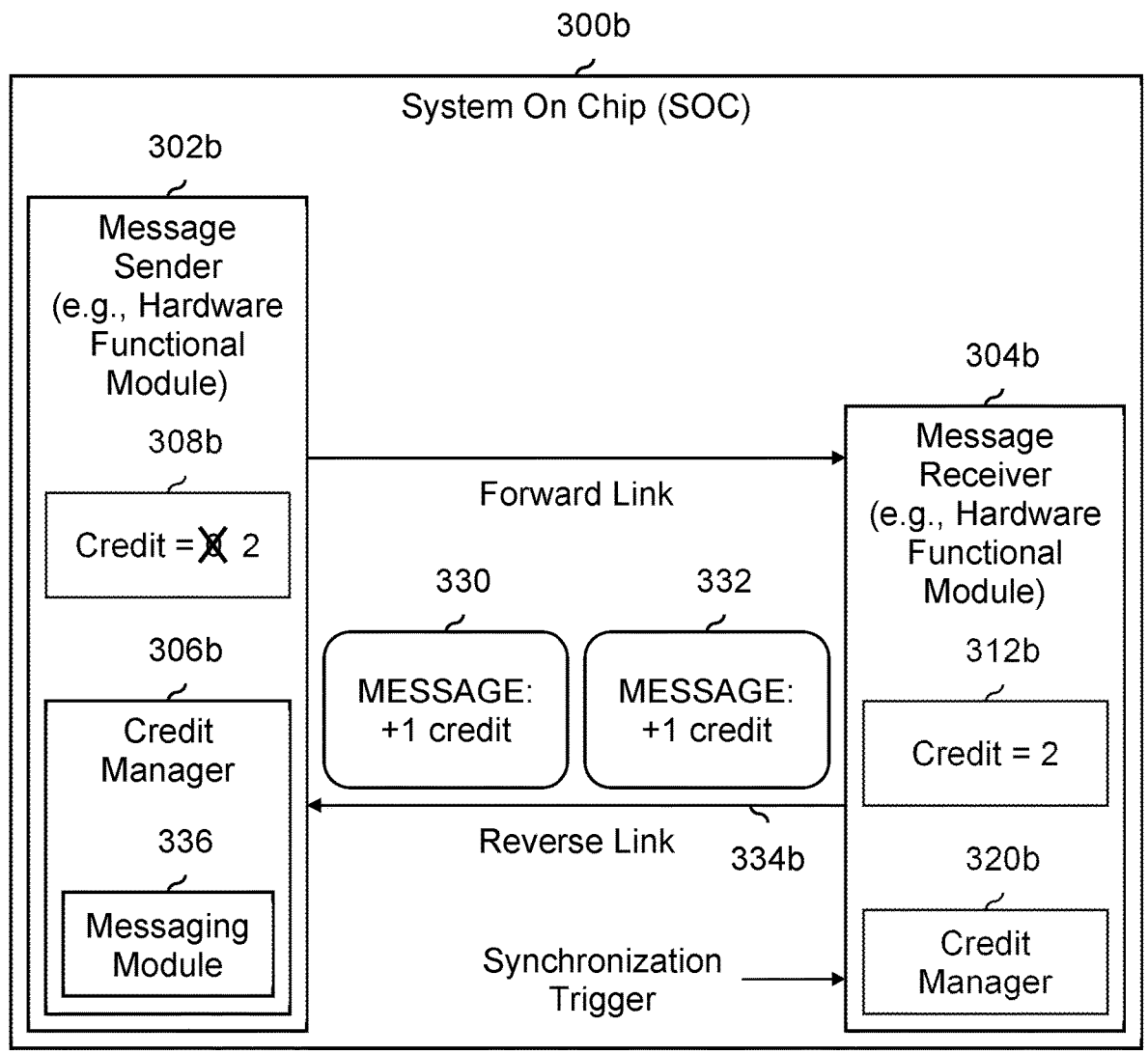
FIG. 3B is a diagram illustrating an embodiment of credit synchronization during initialization showing functional messages that are used to increment a local credit at a message sender.

FIG. 3B is a diagram illustrating an embodiment of credit synchronization during initialization showing functional messages that are used to increment a local credit at a message sender. FIG. 3B continues the example shown in FIG. 3A.

In this example, once the message receiver (304b) in the SOC (300b) has completed initialization (e.g., so a credit manager (320b) on the message receiver (304b) has set a credit (312b) on the message receiver (304b) to have a value of two) and a synchronization trigger is received (e.g., from firmware, not shown), two functional messages (330 and 332) are sent over the reverse link (334b) from the message receiver (304b) to the message sender (302b). In this example, each message (330 and 332) causes a messaging module (336) in the credit manager (306b) at the message sender (302b) to increment the (local) credit (308b) by one so that in total, the (local) credit (308b) in the message sender (302b) goes from a value of zero to a value of two. In some embodiments, a synchronization trigger is associated with or otherwise generated during a power-on and/or initialization process and there is a separate and/or different re-synchronization trigger that is associated with and/or generating in the event of some cleanup. For example, different processes may be performed in responses to the different triggers and/or it may be useful for auditing purposes.

With the (local) credit (308b) in the message sender (302b) at a non-zero value, messages can be sent from the message sender (302b) to the message receiver (304b) where the credit manager (306b) will decrement the credit (308b) by one when a message is sent out and increment the credit (308b) by one when a credit is returned from the message receiver (304b) via the reverse link (334b).

In the context of FIG. 1, the messages (330 and 332) in FIG. 3B show an example of step 102 where a value for a local credit in the message sender is sent, from the message receiver to the message sender, in response to receiving a synchronization trigger.

A benefit to the credit initialization (or, more generally, synchronization) technique described in FIGS. 3A and 3B is that, compared to some other approaches, it is relatively simple and robust. For example, one alternate approach is to have a global and/or centralized credit management system (e.g., at a (e.g., central) firmware complex which is also a message sender) that manages credit synchronization. However, a global and/or centralized credit synchronization approach can add latency, area (e.g., die size in the SOC), and/or complexity, making such an approach unattractive compared to the robust techniques (e.g., because it is self managed instead of globally managed) described herein. The self managed nature of this technique also enables easy scalability. Having a global and/or centralized credit management system also creates dependencies on the centralized credit management system, which limits control path interactions between peripheral modules. In contrast, the distributed and/or independent credit management embodiments at the periphery that are described herein do not have this undesirable dependency on a centralized credit management system.

Taking a step back, it can be imagined that there are other message receivers (e.g., other than 304a/304b) that communicate with the example message sender (e.g., 302a/302b). Those other message receivers may be configured to manage credit synchronization between themselves and the exemplary message sender, so that credit synchronization is distributed at the periphery of the SOC. Managing credit synchronization in this distributed manner and/or at the periphery means that even if one part of the SOC goes down or needs to be reset, credit synchronization can still be supported (as or if needed) in other parts of the system (i.e., it is more robust). In contrast, with a centralized and/or globally managed credit synchronization, the system has a single point of failure. A distributed and/or peripheral credit synchronization approach may also be simpler and/or consume less area in an SOC.

It is noted that functionally equivalent operations can be achieved using different types and/or combinations of messages (e.g., a single message that increments or writes over a credit by some number). The techniques described herein are not necessarily limited to the (e.g., message) embodiments described herein and (as an example) some other types and/or combinations of messages may be used.

As shown in the examples of FIGS. 3A and 3B, in some embodiments, obtaining a synchronization trigger (e.g., at step 100 in FIG. 1) includes enabling, at a message receiver, the synchronization trigger during initialization of the message receiver where the message receiver is included in a hardware functional module in the SOC.

As will be described in more detail below, the logic, messages, and/or functionality that are used to perform the credit initialization in FIGS. 3A and 3B may be re-used to subsequently perform a credit re-synchronization in response to a loss of synchronization between a message sender (302a/302b) and a message receiver (304a/304b). The following figures show an embodiment of this.

Figure 4A:
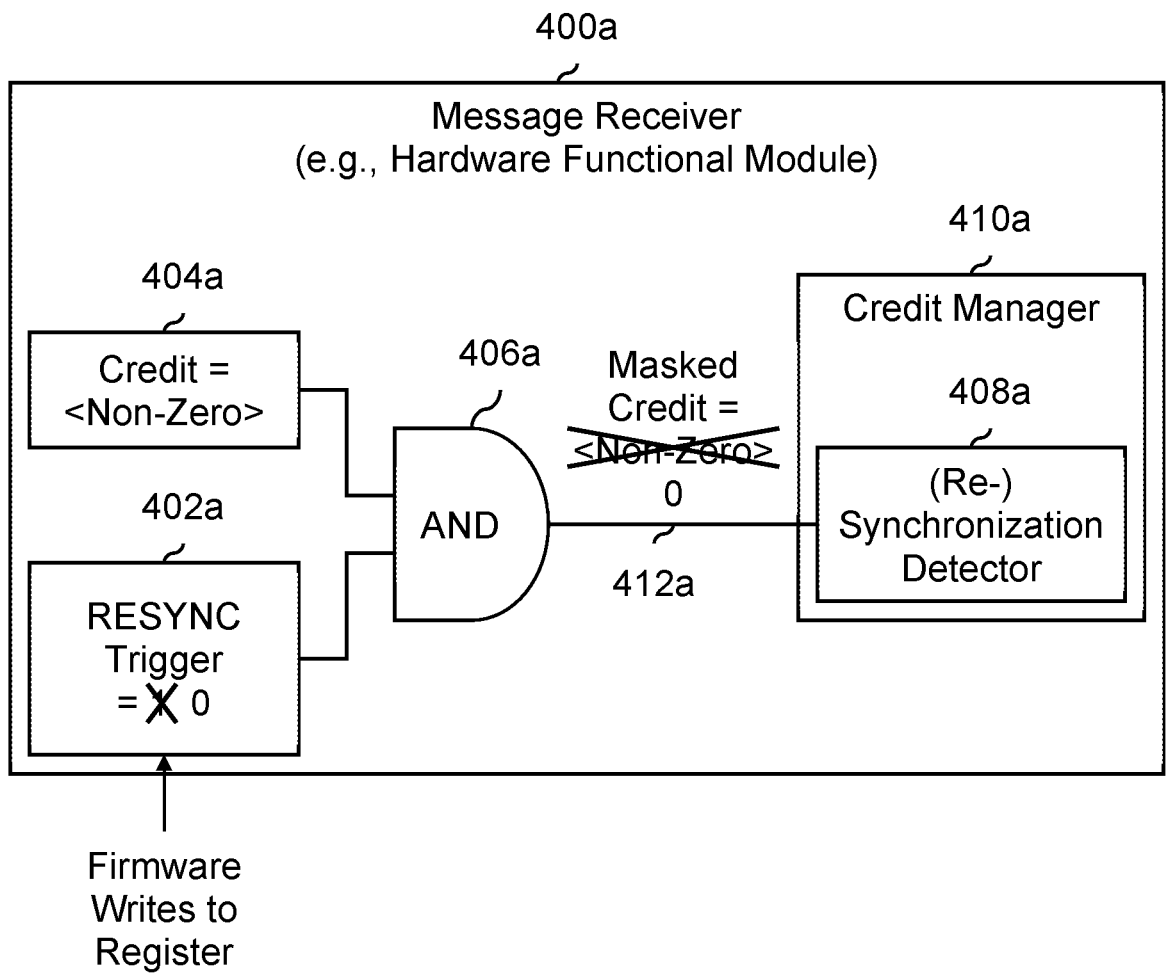
FIG. 4A is a diagram illustrating an embodiment of a message receiver that performs credit re-synchronization using a masked credit after a loss of synchronization.

FIG. 4A is a diagram illustrating an embodiment of a message receiver that performs credit re-synchronization using a masked credit after a loss of synchronization. In this example, a message receiver (400a), a hardware functional module, has frozen, gotten into an error or exception state, or experienced some other loss of synchronization. As a result, a credit re-synchronization is performed (e.g., because it cannot be certain that the credit at the message sender (not shown) is an accurate and/or correct value).

In this example, the message sender or firmware (not shown in FIG. 4A) detects that the exemplary message receiver (400a) has frozen or gotten into some other loss of synchronization state. In response, firmware writes a value of zero (e.g., Boolean FALSE) to the RESYNC trigger register (402a), overwriting the previous value of one (e.g., Boolean TRUE).

The RESYNC trigger register (402a) is combined with the credit (404a) in the message receiver (400a) using an AND (406a) to produce a masked credit (412a). In this example, the credit (404a) is a non-zero value so the masked credit (412a) at the output of the AND (406a) goes from a non-zero value to a zero value.

The masked credit (412a) is input by a (re-)synchronization detector (408a) in the credit manager (410a). The (re-)synchronization detector (408a) detects events associated with (re-)synchronization and the masked credit (412a) going from a non-zero value to a zero value signals a loss of synchronization.

In response to the masked credit (412a) transitioning from a non-zero value to a zero value, the credit manager (410a) (or, more specifically, a messaging module within the credit manager) sends a clear credit message to the message sender (at least in this example); one example of this is shown in the next figure.

Figure 4B:
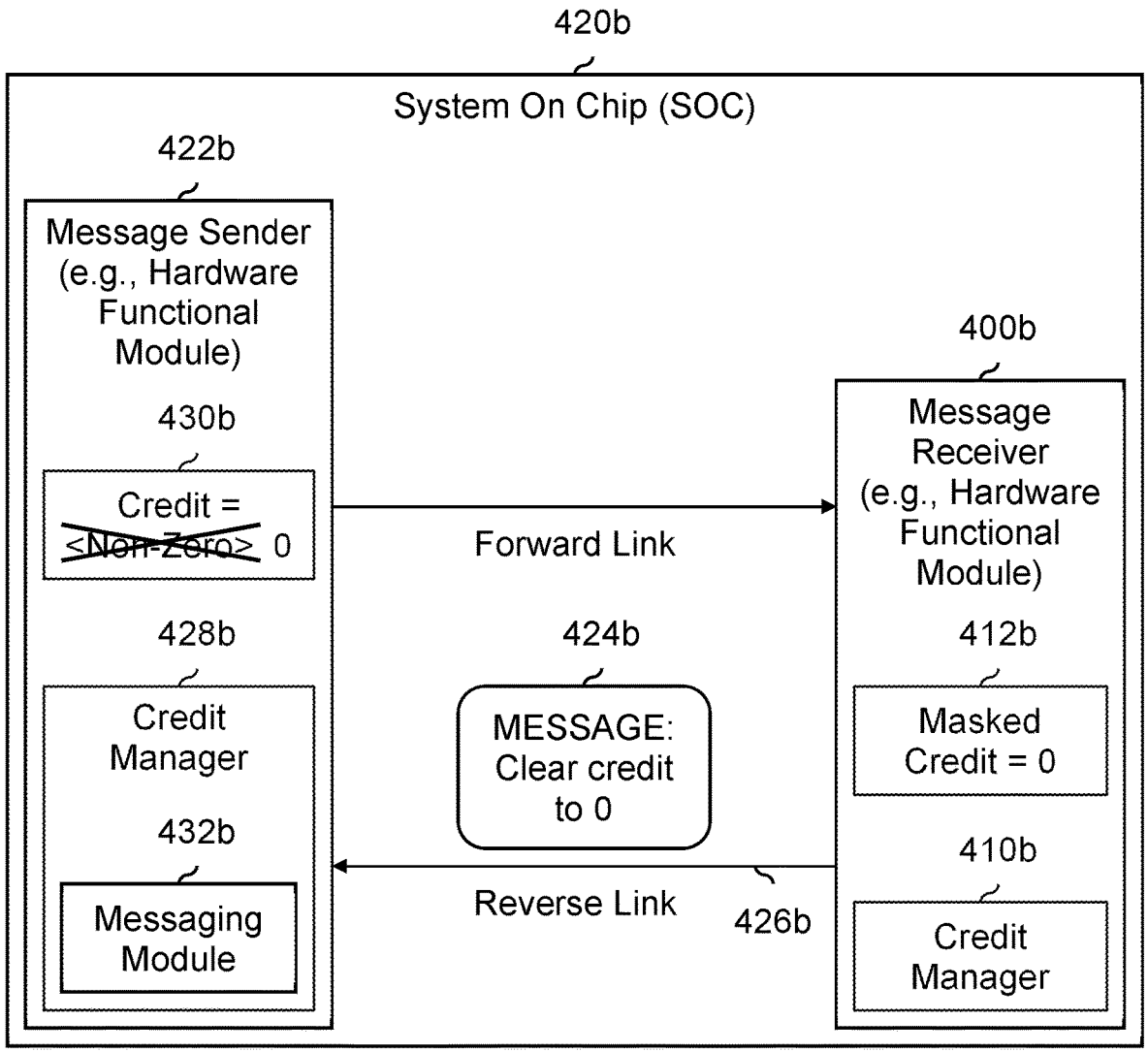
FIG. 4B is a diagram illustrating an embodiment of a message receiver that sends a clear credit message to a message sender.

FIG. 4B is a diagram illustrating an embodiment of a message receiver that sends a clear credit message to a message sender. FIG. 4B continues the example of FIG. 4A. In this example, an SOC (420b) includes a message receiver (400b), which in this example is a hardware functional module, and a message sender (422b), which in this example is firmware. In response to the masked credit (412b) in the message receiver (400b) going from a non-zero value to a zero value, which is detected by a re-synchronization detector (not shown) in the credit manager (410b), a functional message (424b) to clear the credit to zero is sent over the reverse link (426b) to the message sender (422b).

In response to receiving the message (424b), a messaging module (432b) in the credit manager (428b) at the message sender (422b) changes the value of the (local) credit (430b) from a non-zero value to a zero value.

Depending upon the circumstances under which a re-synchronization occurs, there may be a variety of checks and/or operations that may be performed (e.g., to ensure that the message receiver (400b) is ready for message sending to resume) before the (e.g., new) credit value can be sent from the message receiver (400b) to the message sender (422b). In this example, the message receiver (400b) is fully operational (e.g., it did not freeze or enter an error state) and re-synchronization is performed because firmware (422b) realizes its local credit (430b) has lost synchronization. As such, in this example, the (e.g., new) credit value can be sent over without delay. The following figure shows an example of this.

Figure 4C:
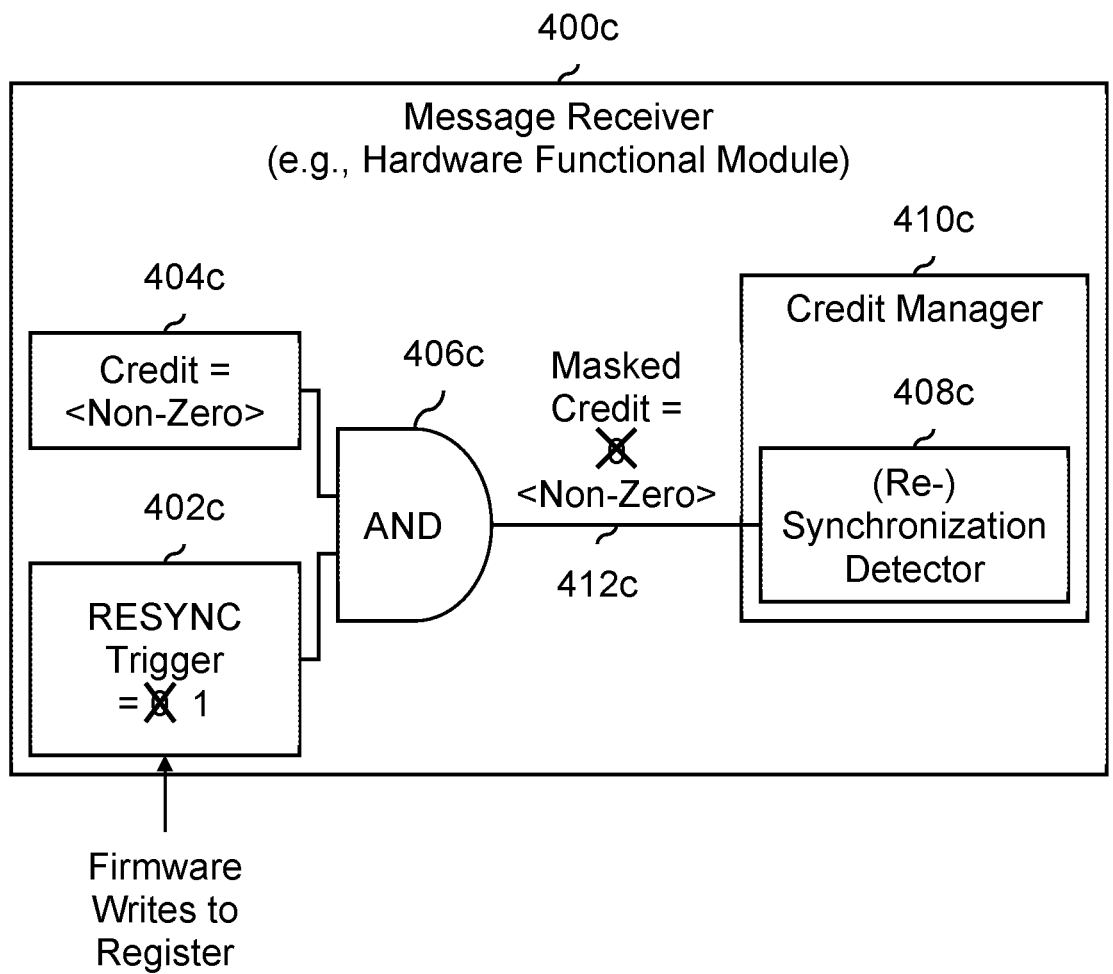
FIG. 4C is a diagram illustrating an embodiment of a message receiver that sends a new credit value in response to a masked credit value.

FIG. 4C is a diagram illustrating an embodiment of a message receiver that sends a new credit value in response to a masked credit value. In this example, firmware writes a one value to the RESYNC trigger register (402c) in the message receiver (400c). In this example, the credit (404c) is a non-zero value that is not changed as part of this process. (Alternatively, if the current value of the credit (404c) needs to be updated before it is sent to the message sender (not shown), then that value is updated, as or if needed.)

The RESYNC trigger register (402c) and credit (404c) are combined in the AND gate (406c) to produce a masked credit (412c) having a value that goes from zero to a non-zero value. The (re-)synchronization detector (408c) in the credit manager (410c) detects this change from zero to non-zero and appropriate functional messages (e.g., to increment a credit) are sent accordingly (e.g., by a messaging module (not shown) in the credit module (410c)). The following figure shows an example of this.

Figure 4D:
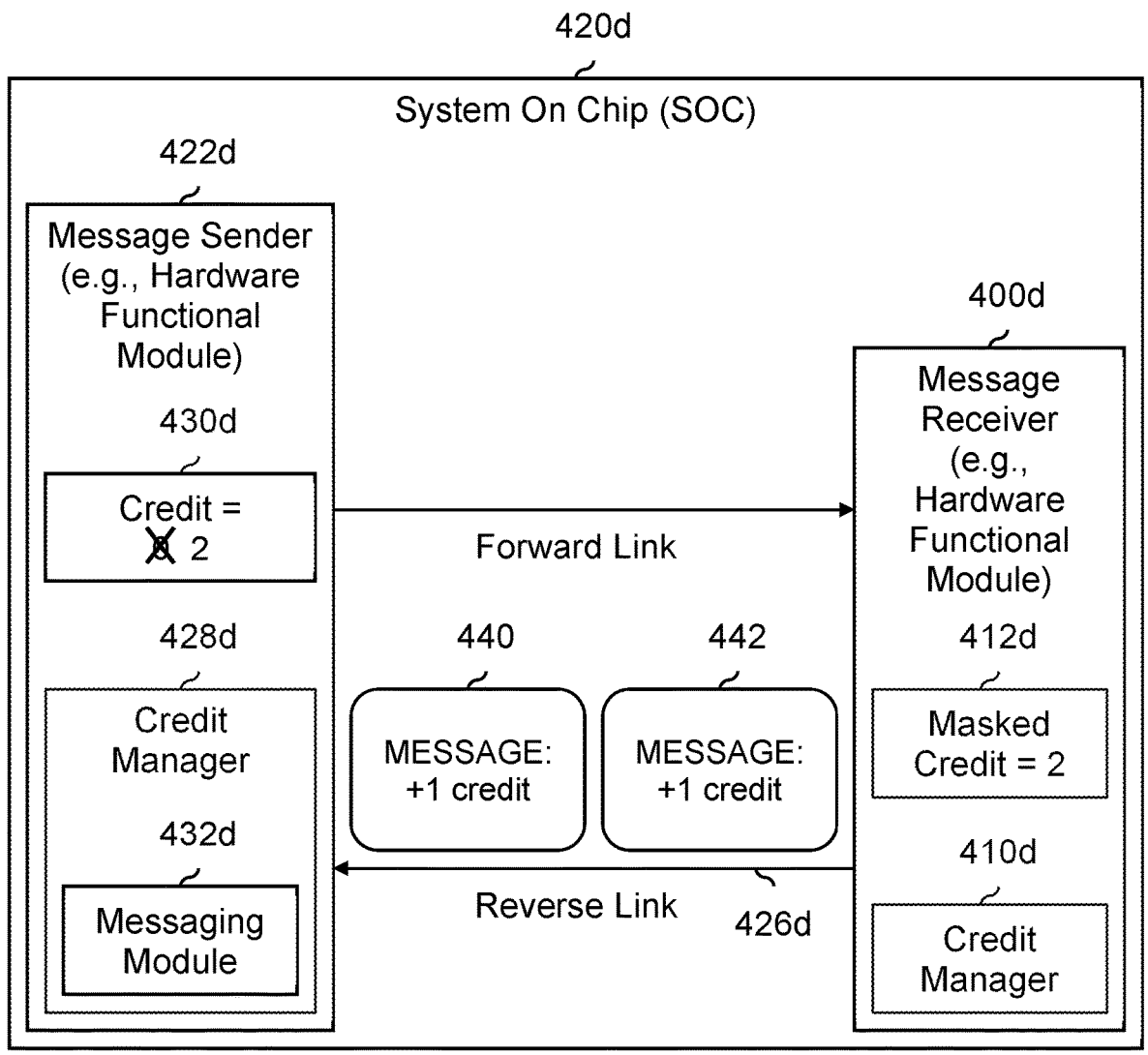
FIG. 4D is a diagram illustrating an embodiment of credit (re-)synchronization using functional messages that are used to increment a local credit at a message sender.

FIG. 4D is a diagram illustrating an embodiment of credit (re-)synchronization using functional messages that are used to increment a local credit at a message sender. In this example, two "increment by one" messages (440 and 442) are sent (e.g., by a messaging module (not shown) in the credit manager (410d) on the message receiver (400d)) from the message receiver (400d) to the message sender (422d) via the reverse link (426d) in the SOC (420d). The messaging module (432d) in the credit manager (428d) performs the messages (440 and 442) so that the credit (430d) in the message sender (422d) goes from zero to two so that the value matches the masked credit (412d) at the message receiver (400d).

As shown in the examples of FIGS. 4A and 4B, in some embodiments, obtaining a synchronization trigger (e.g., at step 100 in FIG. 1) includes receiving, from a message sender, a signal that is used to enable the synchronization trigger during a loss of synchronization, wherein the message receiver is included in a hardware functional module in the SOC.

As shown in the examples of FIGS. 3B, 4B, and 4D in some embodiments, sending the value (e.g., at step 102 in FIG. 1) includes sending a message from the message receiver to the message sender and updating the local credit with the value (e.g., at step 104 in FIG. 1) includes performing, at the message sender, an instruction associated with the message.

It may be helpful to illustrate some embodiments of the credit synchronization technique in some specific applications. The following figures describe some NAND Flash storage controller examples.

Figure 5:
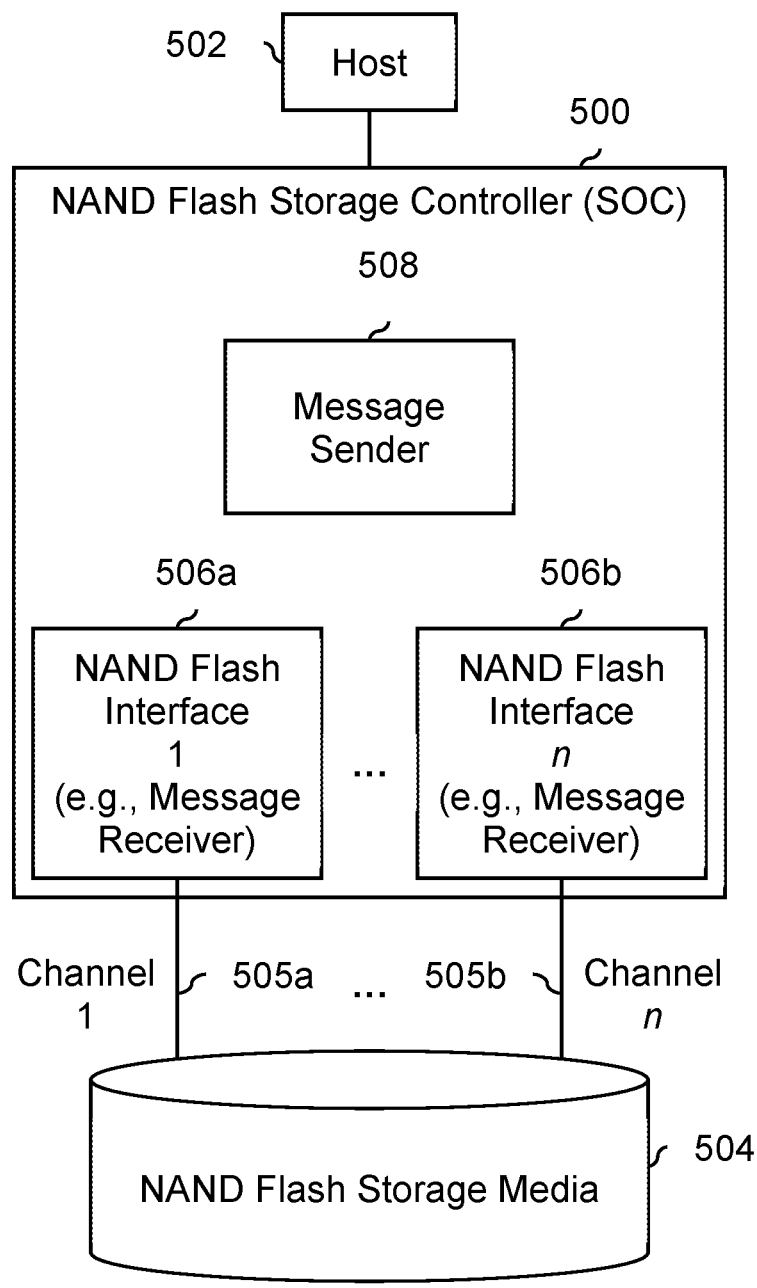
FIG. 5 is a diagram illustrating an embodiment of a NAND Flash storage controller with multiple NAND Flash interfaces that independently perform credit synchronization.

FIG. 5 is a diagram illustrating an embodiment of a NAND Flash storage controller with multiple NAND Flash interfaces that independently perform credit synchronization. In this example, a NAND Flash storage controller (500) is implemented as an SOC. The NAND Flash storage controller (500) sits between a host (502) and NAND Flash storage media (504) and performs read and write operations to the NAND Flash storage media (504) as instructed by the host (502). To preserve the readability of the figure, modules in the NAND Flash storage controller (500) that are not directly related to this credit synchronization example are not included in this figure.

In this example, the NAND Flash storage media (504) has n channels (505a-505b) via which the NAND Flash storage controller (500) communicates with and/or accesses the NAND Flash storage media (504). During development and/or prototype testing of the exemplary storage system, it is not uncommon for engineering test samples to be used in the NAND Flash storage media (504); those engineering test samples can sometimes cause a channel (e.g., one of 505a-505b) to hang, freeze, etc.

Each of the n channels (505a-505b) is managed by and/or associated with a respective NAND Flash interface (506a-506b). Each NAND Flash interface (506a-506b) also acts as a message receiver with respect to a message sender (508). In one example, the message sender (508) is a buffer module that stores read data and write data that is read from and written to, respectively, the NAND Flash storage media (504) via the NAND Flash interfaces (506a-506b). As such, the buffer module sends messages the NAND Flash interfaces (506a-506b) to (as an example) exchange read and write data. In another example, the message sender (508) is a firmware complex that includes a processor module and firmware. For example, a firmware complex may need to (e.g., occasionally) send initialization or re-synchronization triggers or signals to (e.g., specific ones of) the NAND Flash interfaces (506a-506b) during initialization or in the event one of the NAND Flash interfaces (506a-506b) should get "stuck," respectively.

With credit synchronization distributed at the periphery of the system (e.g., at each of the NAND Flash interfaces (506a-506b)) instead of being managed centrally (e.g., at the firmware complex (508)), the NAND Flash storage controller (500) is able to recover more gracefully and/or quickly if one of the channels (505a-505b) freezes. For example, if the first channel (505a) freezes, the first NAND Flash interface (506a) is reset (which cannot be avoided) but the other NAND Flash interfaces (e.g., including the $n^{th}$ NAND Flash interface (506b)) would not need to be reset and those channels could continue to be used without interruption. This is enabled and/or supported because credit synchronization is located at the NAND Flash interfaces (506a-506b). In contrast, if credit synchronization were centrally managed (e.g., at the firmware complex (508)), then all of the NAND Flash interfaces (506a-506b) would need to be reset, making all of the channels temporarily unusable.

As is shown in this example, in some embodiments, the SOC is associated with a storage controller; the storage controller includes a firmware complex which in turn includes a processor module and firmware; and the storage controller further includes a plurality of channel interface modules, wherein each of the plurality of channel interface modules independently acts as the message controller with the firmware complex as the message sender.

Figure 6:
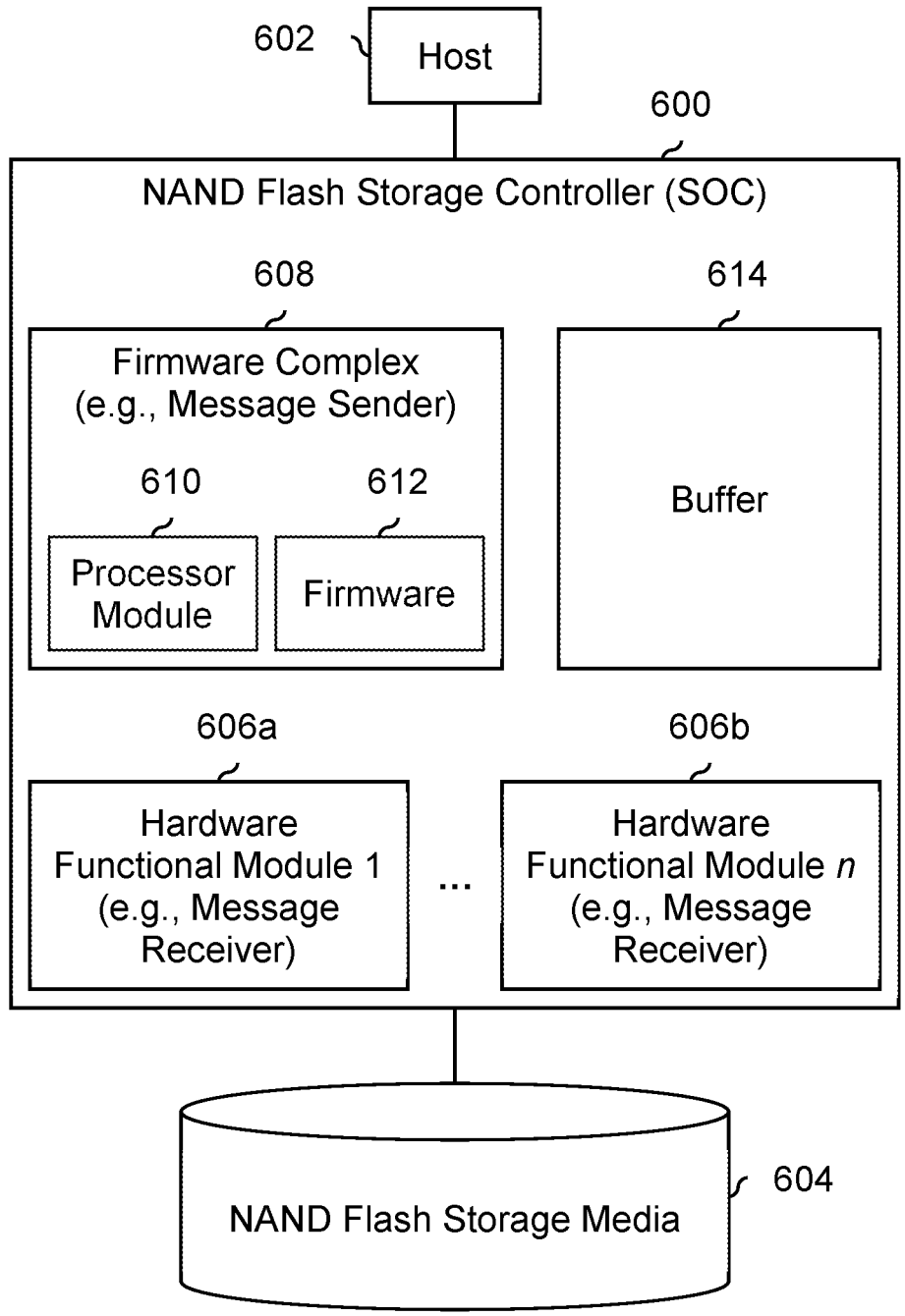
FIG. 6 is a diagram illustrating an embodiment of a NAND Flash storage controller with multiple hardware functional modules that access a common buffer and independently perform credit synchronization.

FIG. 6 is a diagram illustrating an embodiment of a NAND Flash storage controller with multiple hardware functional modules that access a common buffer and independently perform credit synchronization. In this example, the NAND Flash storage controller (600) is implemented as an SOC and performs read and write operations to NAND Flash storage media (604) per the instructions from a host (602). In this example, there is a (e.g., common and/or shared) buffer that multiple hardware functional modules (606a-606b) use to store data in. For example, there may be large amounts of write data being sent from the host (602) to the NAND Flash storage media (604) and read data in the other direction. The buffer (614) may be used to store this read or write data as it is passing through the NAND Flash storage controller (600). The NAND Flash storage controller (600) may also need to perform a variety of operations on data before it can be sent up to the host (602) or down to the NAND Flash storage media (604). For example, for error correction purposes or security-related encryption, the data may be encoded using a code prior to being stored in NAND Flash storage media (604); when read back, the read data would be decoded before being sent to the host (602). In another example, write data from the host (602) may be fragmented before being written to the NAND Flash storage media (604); the read data would be reassembled before being passed to the host (602). While these (exemplary) operations are being performed, the data (e.g., at various stages of processing or completion) may be stored in the buffer (614).

As can be imagined, there are many hardware functional modules (606a-606b) that access and/or are in communication with the buffer (614). These hardware functional modules (606a-606b) (e.g., independently) manage credit synchronization (e.g., with the firmware complex (608) which includes a processor module (610) and firmware (612) acting as a message sender).

If one of the hardware functional modules (e.g., the first hardware functional module (606a)) entered an error state and needed to be reset, the distributed and/or peripheral manner in which credit synchronization is performed allows the other hardware functional modules that are not in the error state (e.g., the $n^{th}$ hardware functional module (606b)) to continue operation. In contrast, with a centralized credit synchronization (e.g., managed by the firmware complex (608)), all of the other hardware functional modules that access the buffer (614) would need to be reset (e.g., because there is no easy way to perform a credit resynchronization with the other hardware functional modules with a centralized credit resynchronization approach).

As is shown in this example, in some embodiments, the SOC is associated with a storage controller; the storage controller includes a firmware complex which in turn includes a processor module and firmware; and the storage controller further includes a plurality of hardware functional modules that access a buffer, wherein each of the plurality of hardware functional modules independently acts as the message controller with the firmware complex as the message sender.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a message receiver in a System On Chip (SOC), wherein the message receiver:
obtains a synchronization trigger associated with synchronizing credit; and
in response to receiving the synchronization trigger, sends, from the message receiver to a message sender in the SOC, a value for a local credit in the message sender; and
the message sender, wherein:
the message sender updates the local credit with the value for the credit that is received from the message receiver;
a requirement to send a message from the message sender to the message receiver is that the local credit has a non-zero value;
obtaining the synchronization trigger includes enabling, at the message receiver, the synchronization trigger during initialization of the message receiver; and
the message receiver is included in a hardware functional module in the SOC.

2. The system of claim 1, wherein:
obtaining the synchronization trigger includes receiving, from the message sender, a signal that is used to enable the synchronization trigger during a loss of synchronization; and
the message receiver is included in a hardware functional module in the SOC.

3. The system of claim 1, wherein:
sending the value includes sending a message from the message receiver to the message sender; and
updating the local credit with the value includes performing, at the message sender, an instruction associated with the message.

4. A system, comprising:
a message receiver in a System On Chip (SOC), wherein the message receiver:
obtains a synchronization trigger associated with synchronizing credit; and
in response to receiving the synchronization trigger, sends, from the message receiver to a message sender in the SOC, a value for a local credit in the message sender; and
the message sender, wherein:
the message sender updates the local credit with the value for the credit that is received from the message receiver;
a requirement to send a message from the message sender to the message receiver is that the local credit has a non-zero value;
the SOC is associated with a storage controller; and
the storage controller further includes a plurality of channel interface modules, wherein each of the plurality of channel interface modules independently acts as a message receiver.

5. The system of claim 4, wherein:
the buffer module acts as the message sender.
6. The system of claim 4, wherein:
obtaining the synchronization trigger includes receiving, from the message sender, a signal that is used to enable the synchronization trigger during a loss of synchronization; and
the message receiver is included in a hardware functional module in the SOC.
7. The system of claim 4, wherein:
sending the value includes sending a message from the message receiver to the message sender; and
updating the local credit with the value includes performing, at the message sender, an instruction associated with the message.
8. A system, comprising:
a message receiver in a System On Chip (SOC), wherein the message receiver:
obtains a synchronization trigger associated with synchronizing credit; and
in response to receiving the synchronization trigger, sends, from the message receiver to a message sender in the SOC, a value for a local credit in the message sender; and
the message sender, wherein:
the message sender updates the local credit with the value for the credit that is received from the message receiver;
a requirement to send a message from the message sender to the message receiver is that the local credit has a non-zero value;
the SOC is associated with a storage controller;
the storage controller includes a firmware complex which in turn includes a processor module and firmware; and
the storage controller further includes a plurality of hardware functional modules that access a buffer, wherein each of the plurality of hardware functional modules independently acts as a message receiver with the firmware complex as the message sender.
9. A method, comprising:
obtaining, at a message receiver in a System On Chip (SOC), a synchronization trigger associated with synchronizing credit;
in response to receiving the synchronization trigger, sending, from the message receiver to a message sender in the SOC, a value for a local credit in the message sender; and
updating, at the message sender, the local credit with the value for the credit that is received from the message receiver, wherein a requirement to send a message from the message sender to the message receiver is that the local credit has a non-zero value, wherein:
obtaining the synchronization trigger includes enabling, at the message receiver, the synchronization trigger during initialization of the message receiver; and
the message receiver is included in a hardware functional module in the SOC.
10. The system of claim 8, wherein:
obtaining the synchronization trigger includes receiving, from the message sender, a signal that is used to enable the synchronization trigger during a loss of synchronization; and
the message receiver is included in a hardware functional module in the SOC.

11. The system of claim 8, wherein:
sending the value includes sending a message from the message receiver to the message sender; and
updating the local credit with the value includes performing, at the message sender, an instruction associated with the message.
12. The method of claim 9, wherein:
obtaining the synchronization trigger includes receiving, from the message sender, a signal that is used to enable the synchronization trigger during a loss of synchronization; and
the message receiver is included in a hardware functional module in the SOC.
13. The method of claim 9, wherein:
sending the value includes sending a message from the message receiver to the message sender; and
updating the local credit with the value includes performing, at the message sender, an instruction associated with the message.
14. A method, comprising:
obtaining, at a message receiver in a System On Chip (SOC), a synchronization trigger associated with synchronizing credit;
in response to receiving the synchronization trigger, sending, from the message receiver to a message sender in the SOC, a value for a local credit in the message sender; and
updating, at the message sender, the local credit with the value for the credit that is received from the message receiver, wherein a requirement to send a message from the message sender to the message receiver is that the local credit has a non-zero value, wherein:
the SOC is associated with a storage controller; and
the storage controller further includes a plurality of channel interface modules, wherein each of the plurality of channel interface modules independently acts as a message receiver.
15. The method of claim 14, wherein:
the buffer module acts as the message sender.
16. The method of claim 14, wherein:
obtaining the synchronization trigger includes receiving, from the message sender, a signal that is used to enable the synchronization trigger during a loss of synchronization; and
the message receiver is included in a hardware functional module in the SOC.
17. The method of claim 14, wherein:
sending the value includes sending a message from the message receiver to the message sender; and
updating the local credit with the value includes performing, at the message sender, an instruction associated with the message.
18. A method, comprising:
obtaining, at a message receiver in a System On Chip (SOC), a synchronization trigger associated with synchronizing credit;
in response to receiving the synchronization trigger, sending, from the message receiver to a message sender in the SOC, a value for a local credit in the message sender; and
updating, at the message sender, the local credit with the value for the credit that is received from the message receiver, wherein a requirement to send a message from the message sender to the message receiver is that the local credit has a non-zero value, wherein:

the SOC is associated with a storage controller;

the storage controller includes a firmware complex which in turn includes a processor module and firmware; and the storage controller further includes a plurality of hardware functional modules that access a buffer, wherein each of the plurality of hardware functional modules independently acts as a message receiver with the firmware complex as the message sender.

19. The method of claim 18, wherein:

obtaining the synchronization trigger includes receiving, from the message sender, a signal that is used to enable the synchronization trigger during a loss of synchronization; and the message receiver is included in a hardware functional module in the SOC.

20. The method of claim 18, wherein:

sending the value includes sending a message from the message receiver to the message sender; and updating the local credit with the value includes performing, at the message sender, an instruction associated with the message.

* * * * *